United States Patent Office 3,825,499
Patented July 23, 1974

3,825,499
FUELED MODERATOR COMPOSITION
Peter D. Johnson, Chatsworth, Calif., assignor to the United States of America as represented by the United States Atomic Energy Commission
No Drawing. Filed July 7, 1959, Ser. No. 825,611
Int. Cl. G21c *21/00*
U.S. Cl. 252—301.1 R                 18 Claims My invention relates to an improved method of preparing a homogeneous uranium-beryllium composition, and more particularly to a method of preparing a homogeneous $UO_2$—BeO ceramic fuel composition.

Beryllium and beryllium oxide have been employed heretofore as moderator compositions in nuclear reactors. Both $UO_2$ and BeO are good refractories and possess suitable nuclear properties. However, homogeneous mixtures of $UO_2$ and BeO have in the past not been made with satisfactory results. Such homogeneous compositions were fabricated by mechanically mixing the desired component oxides or compounds, forming, and finally sintering. The $UO_2$ always tended to migrate to the surface of the sintered specimen when subjected to moving air at high temperature. Sintered binary specimens of the prior art also showed decrepitation or volume increases when subjected to an environment of air in the temperature range of 400° to 800° C.

It is, accordingly, an object of my present invention to provide an improved method of preparing a $UO_2$—BeO mixture of superior properties.

Another object of my invention is to prepare a $UO_2$—BeO mixture wherein loss of $UO_2$ at elevated temperatures under oxidizing conditions will be minimized.

Another object is to provide a dimensionally stable $UO_2$—BeO fuel composition for elevated temperature application.

Still another object is to provide a method of preparing a $UO_2$—BeO fuel composition wherein the particles of $UO_2$ will be enclosed within BeO grains.

Still another object is to provide a rapid, relatively simple, and economical method of forming such a composition.

Other objects and advantages of my invention will become apparent from the following detailed description and the appended claims.

In accordance with my present invention, a superior $UO_2$—BeO composition may be formed by preparing a solution of soluble salts of beryllium and uranium, mixing said solution with a source of hydroxyl ions, thereby coprecipitating beryllium and uranium hydrous oxides, separating the resulting precipitate from the resulting solution, and thereafter decomposing the separated precipitate to form a homogeneous $UO_2$—BeO mixture.

The use of my invention results in a mixture wherein the $UO_2$ is very intimately mixed with BeO and is found within the BeO grains. When the composition is subjected to oxidizing conditions at elevated temperatures, the $UO_2$ remains within the BeO matrix and does not significantly diffuse to the surface of the specimen to be lost. Apparently, the $UO_2$ within the BeO grains is less susceptible to oxidation loss than the oxides in the grain boundaries. Furthermore, my composition is of very high density, over 95% of theoretical density. Thus, the intimate mixing and extreme dispersion of $UO_2$ in BeO, high density, and small grain size achieved by my invention improves mechanical strength and fuel retention. Mechanical strength measurements of my $UO_2$—BeO composition exceed any known values ever reported for a ceramic composition.

As the first step in my process a solution of beryllium and uranium salts is formed. Any soluble salt of uranium or beryllium in either aqueous or organic solvents may be used, although the use of inorganic salts soluble in water is more saisfactory. It is preferred to use salts with readily removable, and desirably volatile, anions, to increase the purity of the final product. The anions of the beryllium and uranium salts in a given solution are preferably the same. (Purities of 99% are required.) Non-limiting examples of beryllium and uranium salts are the halides, sulfates, and nitrates. Although uranium can exist in the salt in any valence state such as uranous (4), it is generally preferred to use the uranyl (6) salts since they are more soluble and stable. The preferred salts are beryllium and uranyl sulphates and nitrates ($BeSO_4 \cdot 4H_2O$ and $$UO_2SO_4 \cdot xH_2O;$$

$Be(NO_3)_2 \cdot 3H_2O$ and $UO_2(NO_3)_2 \cdot 6H_2O$).

The weight proportion of $UO_2$ in BeO is infinite and the range of the components in the final material can be varied as desired. The actual concentration of $UO_2$ in BeO will depend upon the uranium enrichment and factors dictated by the particular reactor application. I find, when using highly enriched uranium, say in the range of 90% U-235, that the weight percentage of the $UO_2$ is generally approximately 1–15 weight percent, with about 5–10 weight percent being very common. Thus, for most applications, this results in a beryllium-rich system.

The concentration of the initial uranium and beryllium salt solution may satisfactorily vary over a wide range. However, it is particularly satisfactory to use highly concentrated solutions, and it is preferred to employ the most highly concentrated aqueous solutions which are stable at room temperatures, although elevated temperatures can also be used to increase salt solubility. (Beryllium, because of its toxicity, must be carefully handled, and its solutions are usually contained in rubber or plastic vessels which may be damaged upon heating. Room temperature operations may be carried on outside a hood while elevated temperature steps must be conducted in a hood or glove box.) Furthermore, the use of concentrated solutions is simpler and more economical than the use of larger volumes of dilute solution. Another factor favoring concentrated solutions is that finer particles may be achieved. Solutions of intermediate concentration produce relatively coarser particles, although the very dilute solutions will produce as fine a particle as the concentrated solution. In terms of solution molarity, a satisfactory range is approximately 1 to 3 moles of beryllium per liter, while approximately 2 molar beryllium is preferred. Since the beryllium constitutes by far the greatest amount of salt in solution, the concentration is adjusted with respect to the beryllium ion, and the predetermined amount of uranium salt is added thereto depending upon the amount of enrichment of uranium in the beryllium-rich system.

After the uranium-beryllium salt solution is formed, a flock of uniform consistency is produced by contacting the solution with a source of hydroxyl ions to produce beryllium and uranyl hydrous oxides. The precipitating agent may be any source of hydroxyl ions, both inorganic and organic. Particularly satisfactory results have been obtained with ammonia-containing compounds, such as ammonia gas, ammonium hydroxide, hydroxylamine, urea, and basic amines. Ammonia gas and ammonium hydroxide (concentrated) are preferred. Precipitation is carried out to a slightly basic end point, e.g., about pH 8, in order to facilitate subsequent washing operation and prevent redissolving. The precipitation step may be conducted by either adding the salt solution to the hydroxyl ion solution or by adding the base to the salt solution. I find, nonetheless, that an unexpectedly fine and uniform flock is produced by adding the salt solution to the hydroxyl ion solution. Using the opposite method apparently produces a precipitate which is relatively coarser and lumpier, although superior to any mechanically mixed binary composition. It appears that adding the salt to the base insures that the solubility products of both beryllium and uranium are always exceeded, resulting in true coprecipitation.

After the precipitation is complete, the precipitate is separated from the resulting mother liquor, washed several times with distilled water, adjusted to about pH 8, and then filtered. The precipitate is composed of hydrous oxides of beryllium and uranium, possibly $Be(OH)_2$ and $UO_3 \cdot xH_2O$. The filter cake is then dried and calcined to convert the hydrous oxides to beryllium oxide and uranium oxide. The calcined uranium oxide may be $UO_3$, $U_3O_8$, $U_4O_9$ or other uranium oxides, and mixtures thereof. Calcining may satisfactorily be conducted over a broad range of conditions, for example approximately 750° C.–1300° C. for approximately ½–5 hours. Calcining at approximately 800° C. for approximately three hours is preferred. The uranium is still in the uranyl form after calcining, and must be converted by subsequent sintering into the uranous form of $UO_2$.

After the uniform oxide powder is obtained by the foregoing methods, it may then be made into ceramic bodies for reactor use and the uranium converted to $UO_2$. Forming methods known in the art may be used, such as cold pressing, slip casting, extrusion, isostatic pressing, and hot pressing; which is then followed by sintering. Hot pressing, which is the preferred forming technique, gives the final product $UO_2$—BeO, increases the final density of the product to 95% of theoretical density, and yields a very fine grain polycrystalline mass. The hot pressing may be conducted at temperatures of approximately 1200° C.–1900° C., at pressures ranging from approximately 1000–6000 p.s.i., over approximately fifteen minutes to six hours. Hot pressing at approximate conditions of four hours at 1400° C. and 4000 p.s.i. is preferred.

I find that $UO_2$ loss at high temperatures under oxidizing conditions can be reduced still further by a subsequent heat treatment of the sintered, hot-pressed $UO_2$—BeO body. This post treatment comprises heat treating (annealing) the ceramic in a reducing atmosphere. Any reducing atmosphere, such as CO, may be used, but a hydrogen atmosphere is preferable. The time of the heat treatment under reducing conditions can vary, depending upon the temperatures, over a wide range, for instance fifteen minutes to three hours; the temperature may vary from approximately 1200° C.–1900° C., with a range of approximately 1500° C.–1900° C. being especially useful. An annealing treatment at approximately 1800° C. for approximately one hour in hydrogen is preferred. This heat treatment reduces fuel loss of both sulfate and nitrate coprecipitated material, but is especially useful in reducing fuel loss of nitrate coprecipitated material.

The following specific examples are offered to illustrate my invention in greater detail.

EXAMPLE 1

Sulfate Coprecipitation 458.5 gms. of $BeSO_4 \cdot 4H_2O$ were dissolved in two liters of distilled $H_2O$. 3.61 gms. of $UO_3$ were added to the solution. $H_2SO_4$ was added dropwise until the $UO_3$ was dissolved. The solution was filtered through a paper filter disk in a porcelain Buchner funnel. The solution was then collected in a 4000 ml. Pyrex beaker. Concentrated ammonium hydroxide (28%, specific gravity 0.9) was added with constant stirring to precipitate the hydrous oxides of beryllium and uranium. The precipitating agent, $NH_4OH$, was added until a final pH of 8, as measured with pH indicating paper, was reached. The resulting canary yellow precipitate was vacuum filtered through a porcelain Buchner funnel fitted with a paper filter disk. The precipitate was next washed three times, twice with distilled water brought up to a pH of 8 with the addition of ammonium hydroxide, and once with distilled water. After the last washing, the filter cake was dried for eighty hours at approximately 200° F. resulting in an 83⅓% weight loss.

A small amount of the dried precipitate was loaded into a platinum crucible fitted with a lid and calcined for one hour at approximately 1000° C. The heating rate was slow (approximately 250° C./hr.). The loss in weight was approximately 55%.

Another small portion of the dried precipitate was loaded into a high purity 250 cm.³ alumina crucible. A chromel-alumel thermocouple was inserted in the center of the dry powder. The thermocouple was connected to a recorder which automatically plotted the temperature of the sample versus time. Two thermal arrests were observed, one at approximately 100° C. and the other at approximately 800° C. This indicated that at a temperature of approximately 800° C. the loss of the last volatile constituent (presumably $SO_3$ gas) was initiated.

470.1 gms. of the coprecipitated powder which had been previously dried for eighty hours at 200° F. were loaded into a 4" x 4" x 8" platinum boat covered with a well-fitting pure $Al_2O_3$ lid. The boat was loaded into a muffle furnace and heated at a rate of 100° C. per hour until a temperature of 800° C. was reached. This temperature was held constant for three hours. The furnace was then cooled to room temperature. The coprecipitate powder weighed 231.8 gms. after calcining, resulting in 50¾% loss in weight.

125 gms. of the powder were loaded into a 2³⁄₁₆" I.D. graphite hot pressing die. The sample was pressed for four hours at 1400° C. and 2000 p.s.i. The full pressure was applied when the powder reached a temperature of 1400° C. The resulting sample, a 2³⁄₁₆" diameter x ⅝" thick right circular cylinder, was cut into slabs with a diamond saw. The density of the sample measured on a machined block was 3.12 gm.-cm.³ which is 95.2% of the calculated theoretical density.

Samples approximately ¹⁄₁₆" x ½" x ½" were cut to be tested for their fuel retention characteristics. A transpiration test in which dry air (−80° C., dew point) at the rate of 2.5 c.f.h. was passed over the samples, determined the amount of fuel loss by measuring the total loss in weight of the sample. The samples were maintained at 1650° C. and the duration of the test was four hours. The coprecipitated fuel in the as-hot-pressed condition (not subsequently annealed) lost approximately 25 w/o of the fuel. Under the same severe test conditions, mechanically mixed and sintered $UO_2$—BeO lost 100% of its fuel. Transportation specimens which were subsequently heat treated one hour at 1800° C. in flowing hydrogen lost only approximately 5 w/o of the fuel. The mechanically mixed and similarly pretreated control lost 80% of its fuel under these conditions.

Samples approximately 1" x ⅛" x 0.050" were prepared for modulus of rupture measurements. Approximately ten samples were tested for their breaking strengths at 1200° C. The average modulus of rupture was 32,000 p.s.i., which is the greatest strength ever reported for a ceramic composition.

EXAMPLE 2

Nitrate Coprecipitation 489.7 gms. of $Be(NO_3)_2$—$3H_2O$ and 6.56 gms. of $UO_2(NO_3)_2 \cdot 6H_2O$ were dissolved in 1000 ml. of distilled $H_2O$. The solution was contained in a 2000 ml. Pyrex beaker. The solution was filtered through a Pyrex 60° funnel containing a paper filter disk. The filtration removed any insoluble impurities present in the solution. The filtered solution was collected in a clean 2000 ml. Pyrex beaker. Ammonium hydroxide (28%, 0.9 sp. gr.) was added with constant stirring to the solution to precipitate the hydrous oxides of beryllium and uranium. The addition of $NH_4OH$ was continued until a final pH of 8 as indicated by pH paper, was reached. The resulting precipitate was vacuum filtered through a procelain Buchner funnel which contained a paper filter disk. The precipitate was stirred with distilled water to dissolve any soluble salts and vacuum filtered as above. This procedure was repeated twice making a total of three washings and filtrations. The resulting precipitate was then loaded into a desiccator which had its lid replaced by a large circle of porous filter paper. This desiccator was placed in a moving air oven and the coprecipitated fuel dried for approximately eighty hours at a temperature of 200° F.

The dried powder was loaded into a 4" x 4" x 8" platinum boat which contained a well-fitting $Al_2O_3$ lid. The boat was loaded into a muffle furnace and heated at a rate of 100° C. per hour until a temperature of 800° C. was reached. This temperature was held constant for three hours. The furnace was then cooled to room temperature.

125 gms. of the calcined nitrate coprecipitate were then loaded into a 3/16" I.D. graphite die and hot pressed for four hours at 1400° C. and 2000 p.s.i. The resulting 23/16" O.D. x 5/8" thick right circular cylinder was cut into slabs with a diamond saw.

Transpiration tests were run at 1650° C. for four hours in a −80° C. density point air flowing at 2.5 c.f.h. over 1/2" x 1/16" x 1/16" slabs of the ceramic fuel. Specimens in the as-hot-pressed condition lost 40 w/o of the fuel. A mechanically mixed and sintered control specimen lost 100% of its fuel under the same test conditions. Those specimens of coprecipitated material which had been pretreated for one hour at 1800° C. in flowing $H_2$ lost only 14 w/o of their fuel. A similarly pretreated mechanically mixed control lost 80% of its fuel under these conditions. Thermal expansion data run on fuel bars 2" x 1/8" x 1/8" in the range from 21–1000° C. gave a thermal coefficient of expansion ($\alpha$) of $9.16 \times 10^6$.

The above examples are only illustrative rather than restrictive of my invention. My invention should be understood to be limited only as is indicated in the appended claims.

Having thus described my invention, I claim:

1. A method of forming a $UO_2$—BeO composition, which comprises preparing a solution of beryllium and uranium salts, contacting the resulting solution with a source of hydroxyl ions, thereby coprecipitating beryllium and uranium hydrous oxides, separating the resulting precipitate from the resulting solution, and thereafter decomposing the separated precipitate to form a homogeneous $UO_2$—BeO composition.

2. A method of forming a $UO_2$—BeO composition, which comprises forming an aqueous solution of beryllium and uranium salts, contacting the resulting solution with a source of hydroxyl ions, thereby coprecipitating beryllium and uranium hydrous oxides, separating the resulting precipitate from the resulting solution, and thereafter decomposing the separated precipitate to form a homogeneous $UO_2$—BeO mixture.

3. The method of Claim 2 wherein said salts of beryllium and uranium are selected from the group consisting of halides, nitrates, and sulfates.

4. The method of Claim 2 wherein said source of hydroxyl ions are selected from the group consisting of ammonia containing-compounds.

5. A method of forming a $UO_2$—BeO composition which comprises preparing an aqueous solution of beryllium and uranyl salts selected from the group consisting of halides, sulfates, and nitrates, contacting the resulting solution with a source of hydroxyl ions selected from the group consisting of ammonia-containing compounds, thereby coprecipitating beryllium and uranium hydrous oxides, separating the resulting precipitate from the resulting solution, and thereafter decomposing the separated precipitate to form a $UO_2$—BeO mixture.

6. The method of Claim 5 wherein said separated precipitate is calcined to beryllium oxide and uranium oxide, the resulting oxide powders are formed into a ceramic body, and the resulting body then sintered to yield a ceramic $UO_2$—BeO composition.

7. The method of Claim 5 wherein said solution of beryllium and uranyl salts is added to said source of hydroxyl ions.

8. A method of preparing a $UO_2$—BeO ceramic composition, which comprises forming an aqueous solution of beryllium and uranyl salts, the anion of said salts being selected from the group consisting of sulfate and nitrate, contacting the resulting solution with a solution of ammonium hydroxide, thereby coprecipitating beryllium and uranium hydrous oxides, separating the resulting precipitate from the resulting solution, calcining the resulting precipitate to yield a beryllium and uranium oxide composition, and then hot pressing the resulting oxide composition to yield a $UO_2$—BeO ceramic body.

9. The method of Claim 8 wherein the said $UO_2$—BeO ceramic body is subsequently annealed in a reducing atmosphere selected from the group consisting of CO and hydrogen for a period of approximately fifteen minutes to three hours at a temperature of approximately 1200° C.–1900° C.

10. A method of forming a $UO_2$—BeO ceramic body, which comprises forming an aqueous solution of beryllium and uranyl salts having the same anion, said anion being selected from the group consisting of sulfate and nitrate, the concentration of said beryllium in said solution being approximately 1–3 molar, adding said solution to an aqueous solution of ammonium hydroxide, thereby coprecipitating beryllium and uranium hydrous oxides, separating the resulting precipitate from the resulting solution, calcining the separated precipitate to yield beryllium and uranium oxide powders, hot pressing the resulting calcined powders to yield a $UO_2$—BeO ceramic body, and then annealing the $UO_2$—BeO ceramic in hydrogen for a period of approximately fifteen minutes to three hours at a temperature of approximately 1200° C.–1900° C.

11. The method of Claim 10 wherein said annealing is conducted at a temperature of approximately 1800° C. for approximately one hour in hydrogen.

12. A method of forming a $UO_2$—BeO ceramic body, which comprises contacting an aqueous solution of beryllium sulfate and uranyl sulfate with a source of hydroxyl ions, separating the resulting coprecipitate of beryllium and uranium hydrous oxides from the resulting solution, and then forming a $UO_2$—BeO ceramic body.

13. The method of Claim 12 wherein said source of hydroxyl ions is an aqueous solution of ammonium hydroxide, and wherein said beryllium and uranyl sulfate solution is added to said ammonium hydroxide solution.

14. A method of forming a $UO_2$—BeO ceramic fuel body, which comprises adding an aqueous solution of beryllium and uranyl sulfates to a concentrated aqueous solution of ammonium hydroxide, the molarity of beryllium in said initial solution being approximately two molar, separating the resulting coprecipitate of beryllium and uranium hydrous oxides from the resulting solution, calcining the separated precipitate to yield beryllium and uranium oxide powders, and then hot pressing the calcined powders to give a $UO_2$—BeO ceramic body.

15. The method of Claim 14 wherein the ceramic $UO_2$—BeO body is subsequent annealed in hydrogen for a period of approximately one hour at a temperature of approximately 1800° C.

16. The method of Claim 14 wherein said hot pressing is conducted for approximately four hours at approximately 1400° C. and approximately 4000 p.s.i., and wherein the resulting $UO_2$—BeO ceramic body is subsequently annealed in hydrogen at approximately 1800° C. for approximately one hour.

17. A method of forming a $UO_2$—BeO ceramic fuel body, which comprises providing an aqueous solution of beryllium sulfate and uranyl sulfate, said solution being about 1–3 molar in beryllium, adding said solution to an aqueous solution of ammonium hydroxide, separating the resulting coprecipitate of beryllium and uranium hydrous oxides from the resulting solution, calcining the separated precipitate, hot pressing the calcined powders at a temperature of about 1200–1900° C., at a pressure of about 1000–6000 p.s.i., for about ¼–6 hours, and then annealing the resulting ceramic $UO_2$—BeO body in a hydrogen atmosphere at a temperature of 1200–1900° C. for about ¼–3 hours.

18. A method of forming a $UO_2$—BeO ceramic fuel body, which comprises providing an aqueous solution of beryllium sulfate and uranyl sulfate, said solution being about 1–3 molar in beryllium, adding said solution to an aqueous solution of ammonium hydroxide, separating the resulting coprecipitate of beryllium and uranium hydrous oxides from the resulting solution, calcining the separated precipitate at a temperature of about 750–1300° C. for about ½–5 hours to yield beryllium and uranium oxide powders, hot pressing the calcined powders at a temperature of about 1200–1900° C., at a pressure of about 1000–6000 p.s.i., for about ¼–6 hours, and then annealing the resulting ceramic $UO_2$—BeO body in a hydrogen atmosphere at a temperature of 1200–1900° C. for about ¼–3 hours.

References Cited

UNITED STATES PATENTS

| | | | |
|---|---|---|---|
| 2,766,032 | 10/1956 | Meister | 432—264 |
| 2,868,707 | 1/1959 | Alter et al. | 252—301.1 |

FOREIGN PATENTS

| | | |
|---|---|---|
| 788,284 | 12/1957 | Great Britain. |

OTHER REFERENCES

AEC Document TID-7546, Book 2, March 1958, pp. 400, 446, 447.

AEC Document TID-7530 (Pt. 1), pp. 55–65, April 1957.

AEC Document BMI-1117, pp. 13–17, July 1956.

Proc. S International Conf. on Peaceful Uses of Atomic Energy, August 1955, vol. 9, p. 171.

Proc. Second U.N. International Conf. on the Peaceful Uses of Atomic Energy, vol. 5, pp. 315–36.

CARL D. QUARFORTH, Primary Examiner

R. E. SCHAFER, Assistant Examiner

U.S. Cl. X.R.

264—0.5